March 15, 1955  N. NORDENSTAM  2,704,054
VALVE MECHANISM
Filed March 13, 1953  2 Sheets-Sheet 1
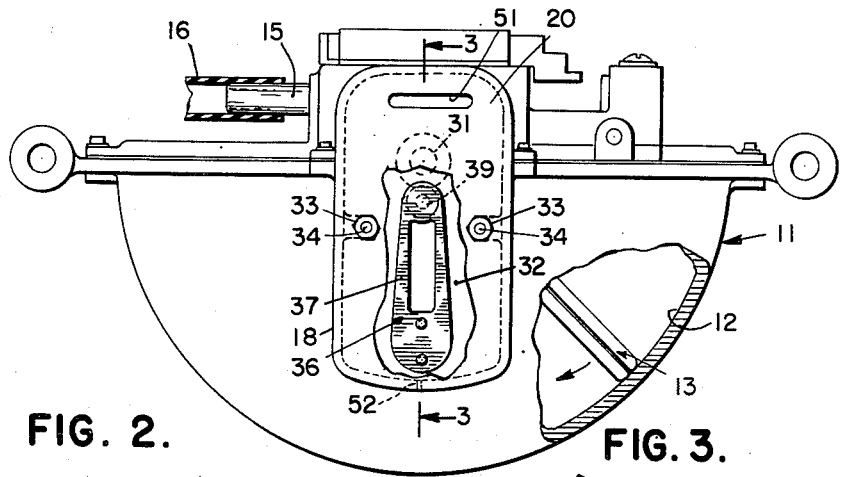
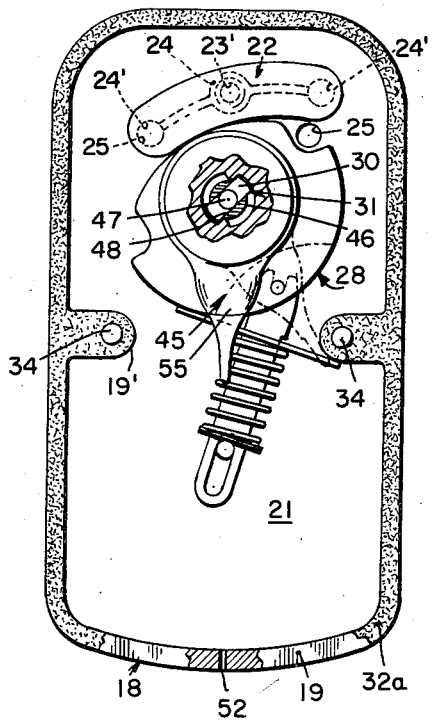
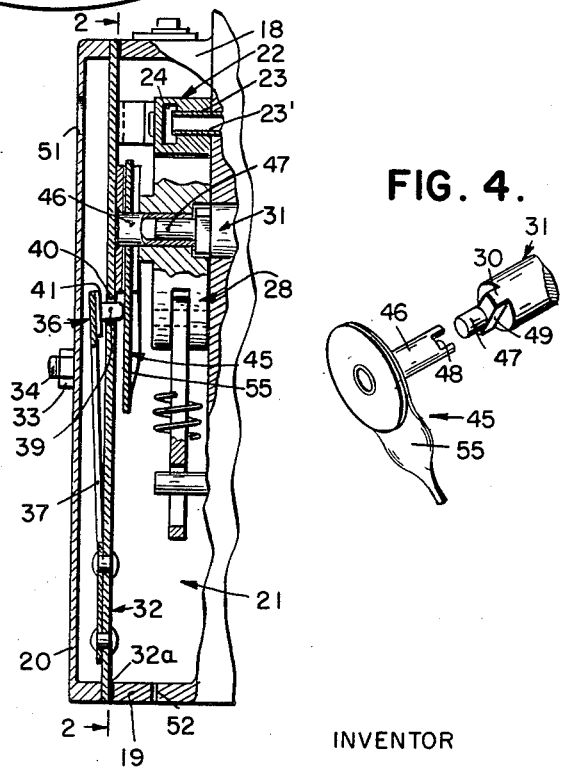
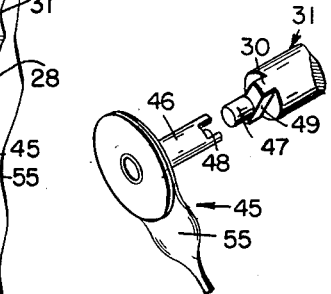
INVENTOR
NORRIS NORDENSTAM
BY
Mason & Graham
ATTORNEYS March 15, 1955 N. NORDENSTAM 2,704,054
VALVE MECHANISM
Filed March 13, 1953 2 Sheets-Sheet 2
FIG. 5.
FIG. 6.
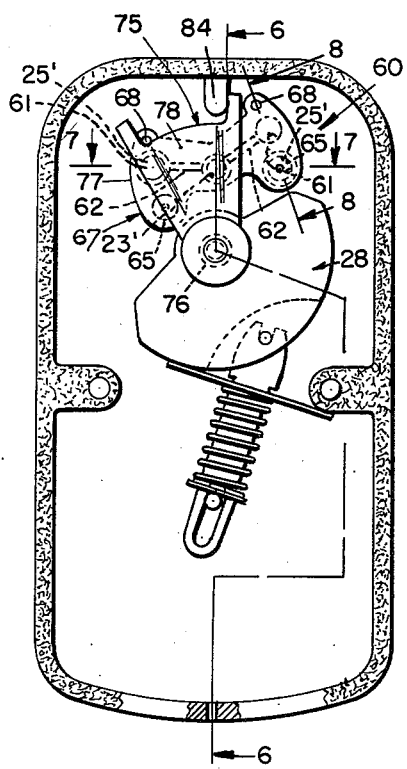
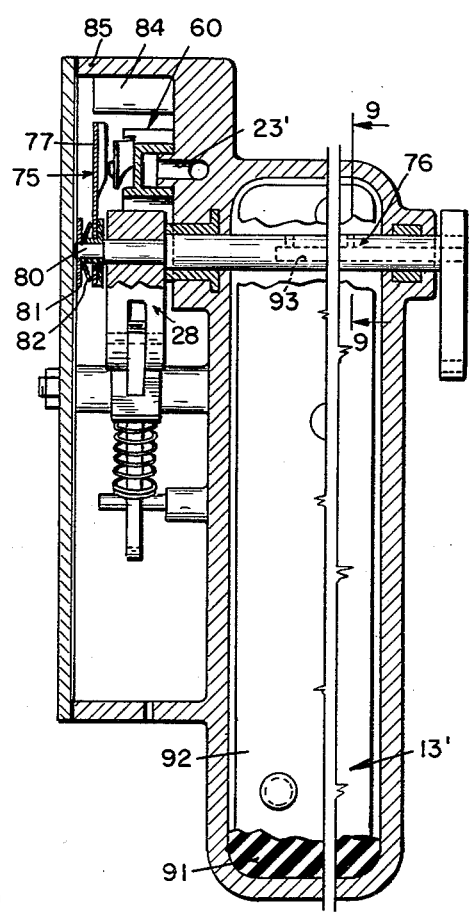
FIG. 7.
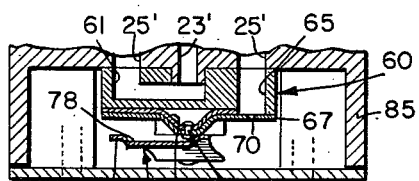
FIG. 8.
FIG. 9.
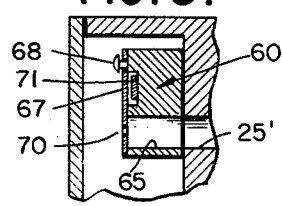
INVENTOR
NORRIS NORDENSTAM
BY
Mason & Graham
ATTORNEYS

United States Patent Office 2,704,054
Patented Mar. 15, 1955

2,704,054

VALVE MECHANISM

Norris Nordenstam, Riverside, Calif.

Application March 13, 1953, Serial No. 342,077

9 Claims. (Cl. 121—164)

This invention has to do with fluid-operated motors, particularly those of the type embodying a reciprocating vane and commonly used for operating windshield wipers on vehicles.

Fluid motors of the type indicated having a reciprocating piston in the form of a vane usually employ a snap action valve mechanism for controlling the fluid passages to the chamber in which the vane operates. An inherent disadvantage of many such mechanisms is the fact that full pressure differential is present on the vane throughout substantially the entire stroke thereof. This results in undue whipping of the windshield wiper blade as the direction of the vane is suddenly reversed at the end of each stroke. While I am aware that several attempts have been made to alleviate this condition by providing means for slowing down the vane toward the end of its stroke, so far as I know, these have not been entirely satisfactory.

An object of my invention is to provide a novel and improved means for so controlling the flow of fluid to the piston or vane of a fluid motor of the type indicated as to cause the vane to slow down as it approaches the end of its stroke and as it begins its stroke, thus preventing undue whipping or overtravel of the object driven by the motor, such as a windshield wiper blade.

Another object is to provide means adaptable for installation on a standard windshield wiper motor for use in controlling the flow of air to the motor whereby the supply of air may be limited or restricted as the vane approaches the end of its stroke and as it begins its stroke. A further object is to provide a simple device or means of the type indicated which can be readily manufactured and embodied in a windshield wiper type of motor but which may also have other uses.

Still another object is to provide means for compensating for leakage past a vane of the type having back-to-back or opposed sealing members.

These and other objects will be apparent from the drawing and the following description.

Referring to the drawing:

Fig. 1 is a side elevational view, partly broken away, of a windshield wiper motor;

Fig. 2 is an enlarged view of the interior of the valve housing with parts broken away and shown in section, substantially in the plane of line 2—2 of Fig. 3;

Fig. 3 is a central sectional elevational view through the valve mechanism in the plane of line 3—3 of Fig. 1;

Fig. 4 is a fragmentary exploded perspective view showing the valve actuating member and the shaft which operates it;

Fig. 5 is a face view of a modified valve mechanism for a fluid motor;

Fig. 6 is a section on line 6—6 of Fig. 5;

Fig. 7 is a section on line 7—7 of Fig. 5;

Fig. 8 is a section on line 8—8 of Fig. 5; and

Fig. 9 is a section on line 9—9 of Fig. 6.

More particularly describing the invention, referring first to Figs. 1–4, numeral 11 designates generally a windshield wiper type of fluid motor which has an arcuate vane compartment 12 and a pivotally mounted piston or vane 13 which is operated by pressure differential on opposite sides thereof. The motor has an externally projecting supply tube 15 which is adapted to be connected by a rubber hose 16 to the intake manifold of an internal combustion engine or to a source of suction.

The motor is provided with a valve housing structure, indicated generally by 18, and this includes a continuous enclosing wall 19 and a cover 20. Wall 19 provides a chamber 21 in which there is mounted a conventional valve 22 on a tubular member 23 which communicates with the tube 15 through a passage 23'. Valve 22 has a passage means 24 extending from the center thereof to the opposite ends terminating in ports 24'. The valve pivots on tube 23 to alternately cover and expose two ports 25 which, through passages not shown, lead to the ends of the compartment 12, respectively.

The motor also has a conventional kicker mechanism which includes kicker 28 rotatably mounted on a shaft 46 of an actuator member 45, later to be described. Since the kicker mechanism for actuating the valve 22 and its function is well known in the art, it will not be described here.

In the operation of the motor, the end of the compartment 12, which is in communication with the port 25, is subjected to suction or a lowering of the air pressure therein when such port is covered by the valve element 22 which connects with supply tube 15 connected to suction. Air enters behind the vane through the exposed port 25. In order to slow down the speed of the vane as it approaches the end of its stroke, and at the beginning of each stroke, I provide means for limiting the amount of air which is supplied to the exposed port when the vane is near either end of its stroke and as it commences a new stroke. To accomplish this, I provide a valve plate 32 which covers and closes the space 21 within wall 19 and a fluid-tight connection is made between this and the wall 19 by means of a gasket 32a, the cover 20 being held in place by nuts 33 upon studs 34.

The plate 31 is provided with a valve 36 comprising a spring portion 37 which is mounted on the plate, as by rivets, and a head 39 which projects through an opening 40 in the plate. At the base of the head or projection 39 I provide a suitable valve seat 41 of leather or the like. Normally the valve is closed except when it is held open by an actuator, generally indicated by numeral 45.

The actuator 45 includes a hollow shaft 46 which receives the reduced end 47 of shaft 31 and which is slotted at 48 to fit over the flat sides 49 of the portion 30 of the shaft. On the end of the shaft 46 there are mounted disks between the latter two of which is mounted the actuator arm 55. This arm is held frictionally and normally rotates with the shaft until it may be stopped by an abutment in its path, after which the shaft can continue to turn independently of the arm.

When the actuator arm 55 is in the region of the valve 36, the latter is cammed to open position as shown in Fig. 3 thereby permitting full supply of air to the exposed port 25, the air entering through an opening 51 in the cover 20 and thence through the opening 40 in the valve plate. When the actuator is not in position to open the valve, the air supply to port 25 is restricted to what can pass through a small opening 52 in the wall 19 of the valve housing which has a cross-sectional area less than either port 25.

In the operation of the device, at the beginning of the stroke, assuming the vane 13 to be traveling in the direction of the arrow, air is supplied behind the vane through the restricted opening 52, valve 36 being closed. At the beginning of the stroke the valve actuator arm 55 would be in the broken-line position of Fig. 2. By the time the vane is moved to the position in which it is shown in the drawing, the valve actuator arm will have moved to the position it occupies in Fig. 2. For several degrees of movement on both sides of this central position, the valve 36 is held open by the actuator as shown in Fig. 3 thereby permitting full supply of air to reach the exposed port 25. However, as the vane continues its travel, the valve actuator arm moves from the position of Fig. 2 in the direction of the arrow until it abuts against the wall 19 at the region 19' and just before it reaches a position thereagainst, it permits valve 36 to close thereby limiting the amount of air which reaches the exposed port 25. In consequence, at the beginning and end of each stroke of the vane the flow of air to behind the vane is restricted to what can pass through port 52 thereby slowing up the speed of the vane as desired.

Referring now to Figs. 5–9, I show another means of accomplishing the limitation of the air supply to the piston compartment at the beginning and end of each stroke. In this form of the invention I provide a special valve member 60 actuated by a conventional kicker mechanism which includes a kicker 28. This valve has a pair of ports 61 which communicate through passages 62 with the suction supply passage 23' in the body of the device. These ports 61 are adapted to alternately register, respectively, with ports 25' in the body of the motor, the latter ports corresponding to ports 25 previously described.

Valve 60 also is provided with two openings 65 which extend completely through the valve and are adapted to alternately register, respectively, with the ports 25'. Thus in the operation of the valve when one port 25' is covered by a port 61 and thereby in communication with the suction supply passage 23', the other port is in registration with one of the openings 65 in the valve through which air must flow to reach the rear side of the piston, indicated by 13'. In order to control or regulate the flow of air through the port 65 I provide a plate 67 which covers the valve, as being loosely secured to a pair of headed projections 68 thereon so that it may have limited movement toward and away from the outer face of the valve. This plate is provided with a pair of small holes or openings 70 which overlie, respectively, the openings 65 in the valve. Plate 67 is biased away from the surface of the valve by a spring 71. This spring and the plate are suitably connected as by rivet 73 and formed to project outwardly in the region of the rivet as shown in Fig. 7.

I provide an actuator member 75 which is operated by the shaft 76 of the piston to urge the plate against the face of the valve during predetermined portions of the stroke of the piston. This actuator member includes an arm 77 which is dished in cross section having a recessed central portion 78. The arm is mounted upon a stem 80 connected to shaft 76 as shown in Fig. 6. Frictional means are interposed between the stem and the arm so that the arm which is normally pivotable with the shaft can slip relative thereto, this means comprising a disk 81 fixed to the stem and a spring washer 82 between the disk and the arm, the latter being rotatable on the stem. An abutment 84 on the casement means 85 serves to limit movement of the arm.

In the operation of the device during the middle portion of the stroke of the piston, arm 77 of the actuator member receives the outwardly projecting portion of the plate in its recessed portion 78 with the result that spring 72 urges the plate 67 away from the valve face permitting free flow of air to the appropriate opening 65 and port 25'. However, as the piston approaches the end of its stroke and for a limited time on its return stroke the actuator arm serves to depress the plate against the face of the valve as shown in Figs. 7 and 8, thereby restricting flow of fluid to the arm to an amount which can pass through the restricted opening 70.

I also contemplate that it may be advisable in some instances to provide means for compensating for escape of air past the piston where the piston is of the type having a pair of laterally spaced sealing members. Referring to Figs. 6 and 9, I show piston 13' as provided with laterally spaced sealing members 91 and suitable supporting plates 92. The shaft 76 is provided with a passage 93 which extends through the end portion of the shaft which projects exteriorly of the motor and which terminates at its inner end in the space between the sealing members 91 whereby providing a means for entrance of air into the interior of the piston to compensate for air which would otherwise pass or leak by a worn piston of this type.

Although I have illustrated and described a preferred form of my invention, I contemplate that various changes and modifications can be made without departing from the invention, the scope of which is indicated by the following claims.

I claim:

1. In a fluid motor having a piston compartment and a piston reciprocable therein under influence of differential fluid pressure, having a supply passage and a pair of piston compartment passages communicating, respectively, with the ends of said compartment and each terminating in a port, and valve means for alternately covering and connecting said ports to said supply passage and exposing the same to atmosphere, means for controlling flow of fluid through the exposed port, comprising housing means enclosing said ports, said housing means having an opening therein to atmosphere, a normally closed control valve controlling said opening, and means operable in response to reciprocation of said piston for opening said control valve during the intermediate portion of the stroke of the piston.

2. Means as set forth in claim 1 in which said housing means is provided with a restricted opening having an effective cross-sectional area substantially less than that of one of said ports.

3. In a fluid motor having a piston compartment and a piston reciprocable therein under influence of differential fluid pressure, having a supply passage and a pair of piston compartment passages communicating, respectively, with the ends of said compartment and each terminating in a port, and valve means for alternately covering and connecting said ports to said supply passage and exposing the same to atmosphere, means for controlling flow of fluid through the exposed port, comprising housing means enclosing said ports, said housing means having an opening therein to atmosphere, a control valve controlling said opening, and means operable in response to reciprocation of said piston for operating said control valve, said last-mentioned means comprising a valve actuator member operatively connected to said piston and engageable with said control valve to open the same during the intermediate portion of the stroke of the piston.

4. In a fluid motor having a piston compartment and a piston reciprocable therein under influence of differential fluid pressure, having a supply passage and a pair of piston compartment passages communicating, respectively, with the ends of said compartment and each terminating in a port, and valve means for alternately covering and connecting said ports to said supply passage and exposing the same to atmosphere, means for controlling flow of fluid through the exposed port, comprising fluid flow restricting means interposed between said exposed port and atmosphere substantially restricting flow of fluid to said port, and an actuator member operably connected to said piston engageable with said fluid flow restricting means to render it inoperative during the intermediate portion of the stroke of the piston.

5. In a fluid motor having a piston compartment and a piston reciprocable therein under influence of differential fluid pressure, having a supply passage and a pair of piston compartment passages communicating, respectively, with the ends of said compartment and each terminating in a port, and valve means for alternately covering and connecting said ports to said supply passage and exposing the same to atmosphere, means for controlling flow of fluid through the exposed port, comprising housing means enclosing said ports, said housing means having an opening therein to atmosphere, a control valve controlling said opening, said housing having a restricted opening having an effective cross-sectional area substantially less than that of one of said ports, a valve actuator member operatively connected to said piston for reciprocation therewith, said actuator member being engageable with said control valve to open the same during the intermediate portion of the stroke of the piston.

6. In a fluid motor as set forth in claim 5 having a piston shaft on which the piston is carried, means for controlling flow of fluid through the exposed port as defined in claim 5 in which said valve actuator member is provided with a stem rotatable with said piston shaft, a head on the stem engageable with said control valve and a slippable friction drive connection between the head and stem, and in which abutment means are provided limiting movement of said head rotatively to an amount less than the rotative movement of said piston.

7. In a fluid motor having a piston compartment and a piston reciprocable therein under influence of differential fluid pressure, having a supply passage and a pair of piston compartment passages communicating, respectively, with the ends of said compartment and each terminating in a port, means for controlling flow of fluid through said ports, comprising a valve for alternately connecting said ports to said supply passage, said valve member having a pair of openings therethrough adapted to alternately register, respectively, with said ports when the same are not connected to said supply passage, means operatively connected to said piston for operating said valve, a plate mounted on said valve overlying said openings, said plate having a pair of small openings therein, respectively, registering with but of less cross-sectional area than the openings in said valve, and means operatively connected to said piston for urging said plate against said valve to close off the openings through said valve except for the small openings through said plate during the end and beginning portions of the stroke of the piston, and means for urging said plate away from said openings in said valve during the remaining portion of the stroke of said piston.

8. Means as set forth in claim 7 in which said plate is mounted for limited movement toward and away from the outer surface of said valve in the region of the openings therethrough and in which a spring is interposed between said plate and valve yieldably urging said plate away from said valve.

9. In a fluid motor having a piston compartment and a piston reciprocable therein under influence of differential fluid pressure, having a supply passage and a pair of piston compartment passages communicating, respectively, with the ends of said compartment and each terminating in a port, means for controlling flow of fluid through said ports, comprising a valve for alternately connecting said ports to said supply passage, said valve member having a pair of openings therethrough adapted to alternately register, respectively, with said ports when the same are not connected to said supply passage, means operatively connected to said piston for operating said valve, a plate mounted on said valve overlying said openings, said plate having a pair of small openings therein, respectively, registering with but of less cross-sectional area than the openings in said valve, said plate being mounted for limited movement toward and away from the surface of said valve in the region of the openings therethrough, a spring between said valve and plate urging said plate away from the area of the valve around the openings therethrough, and an actuator member operably connected to said piston engageable with said plate and operable to urge said plate against said valve during the end and beginning portions of the stroke of the piston.

References Cited in the file of this patent
UNITED STATES PATENTS

| | | |
|---|---|---|
| 2,012,817 | Horton et al. | Aug. 27, 1935 |
| 2,045,861 | Duskin | June 30, 1936 |
| 2,348,492 | O'Shei | May 9, 1944 |
| 2,499,671 | Nordenstam | Mar. 7, 1950 |
| 2,563,068 | Rappl et al. | Aug. 7, 1951 |